United States Patent [19]
Kuroda et al.

[11] Patent Number: 5,220,543
[45] Date of Patent: Jun. 15, 1993

[54] COMPACT OPTICAL DISC RECORDING/REPRODUCING SYSTEM

[75] Inventors: Junji Kuroda, Zama; Yasuo Haneji, Aikawa; Toru Yamagishi, Setagaya; Koji Tanaka, Nakano; Takaro Mori, Sagamihara; Noriyoshi Kokubo; Masayuki Suzuki, both of Yokohama; Kunihisa Matsuzaki, Yokosuka, all of Japan

[73] Assignee: Victor Company of Japan, Ltd., Yokohama, Japan

[21] Appl. No.: 804,523

[22] Filed: Dec. 10, 1991

Related U.S. Application Data

[63] Continuation of Ser. No. 478,588, Feb. 12, 1990, abandoned.

[30] Foreign Application Priority Data

Feb. 14, 1989 [JP] Japan .................. 1-34167
Apr. 28, 1989 [JP] Japan .................. 1-111308
Jun. 19, 1989 [JP] Japan .................. 1-156269

[51] Int. Cl.$^5$ ............................... G11B 21/10
[52] U.S. Cl. ................ 369/13; 369/44.14; 369/44.15; 369/44.16
[58] Field of Search ............... 369/13, 44.15, 44.16, 369/275.1, 275.2, 44.21, 44.22; 360/59, 114

[56] References Cited

U.S. PATENT DOCUMENTS

| | | | |
|---|---|---|---|
| 4,507,763 | 3/1985 | Kato | 369/275.3 |
| 4,557,564 | 12/1985 | van Rosmalen | 369/44.15 |
| 4,680,743 | 7/1987 | Araki | 369/44.16 |
| 4,701,895 | 10/1987 | VanSant | 369/13 |
| 4,718,050 | 1/1988 | Kurz et al. | 369/44.16 |
| 4,751,694 | 6/1988 | Naito et al. | 369/112 |
| 4,764,912 | 8/1988 | Ando et al. | 369/13 |
| 4,767,187 | 8/1988 | Gijzen et al. | 350/247 X |
| 4,813,033 | 3/1989 | Baasch et al. | 350/255 X |
| 4,821,253 | 4/1989 | Usui et al. | 369/54 |
| 4,822,139 | 4/1989 | Yoshizumi | 350/257 |
| 4,858,212 | 8/1989 | Takahashi et al. | 369/13 |
| 4,885,653 | 12/1989 | Kato | 369/290 |
| 4,916,684 | 4/1980 | Odawada et al. | 369/215 |
| 4,926,411 | 5/1990 | Ouwerkerk et al. | 369/291 |
| 5,001,694 | 3/1991 | Lee et al. | 369/44.16 |

FOREIGN PATENT DOCUMENTS

60-9067 of 0000 Japan .
58-37850 of 1983 Japan .
59-11544 of 1984 Japan .
60-12834 of 1985 Japan .
61-87229 of 1986 Japan .
63-257944 of 1988 Japan .
63-304452 of 1988 Japan .
64-52267 of 1989 Japan .

OTHER PUBLICATIONS

Literature I, 3.5 inch Standardization Committee Document Part 4 (SWG 1988.11.28).
Literature II, SPIE vol. 329 (1982) "Tracking Techniques in Pregrooved Optical Disk Technology".
Literature III, SPIE vol. 529 (1985) "Sector Servo Data File Optical Disk Memory".
SPIE vol. 695, Optical Mass Data Storage II (1986), pp. 239-242.
Electronics International, "Magneto-optics pack 5-cm disk with 10 megabytes", Dec. 29, 1982, pp. 45-46.
Electronics, Technology Readout, "Erasable Optical Disks Are On the Horizon", Jun. 24, 1985, p. 67.

Primary Examiner—Eugene R. LaRoche
Assistant Examiner—Tan Nguyen
Attorney, Agent, or Firm—Jacobson, Price, Holman & Stern

[57] ABSTRACT

An optical recording/reproducing system for optically recording and reproducing an information signal on and from an optical disc (31) to be recorded with a plurality of track turns includes a light source (52); an optical head (45b) carrying an objective lens (62) for directing a light beam from the light source (52) to one of the track turns, and a tracking servo actuator for displacing the light beam within a movable range to perform both track feed and tracking servo operations for one of the track turns; the optical head (45b) being stationary with respect to the optical disc (31) while performing the track feed and tracking save operations by displacing the light beam in a radial direction of the optical disc; and a recording area on the optical disc having a radial distance equal to or smaller than the movable range of the tracking servo actuator.

9 Claims, 11 Drawing Sheets

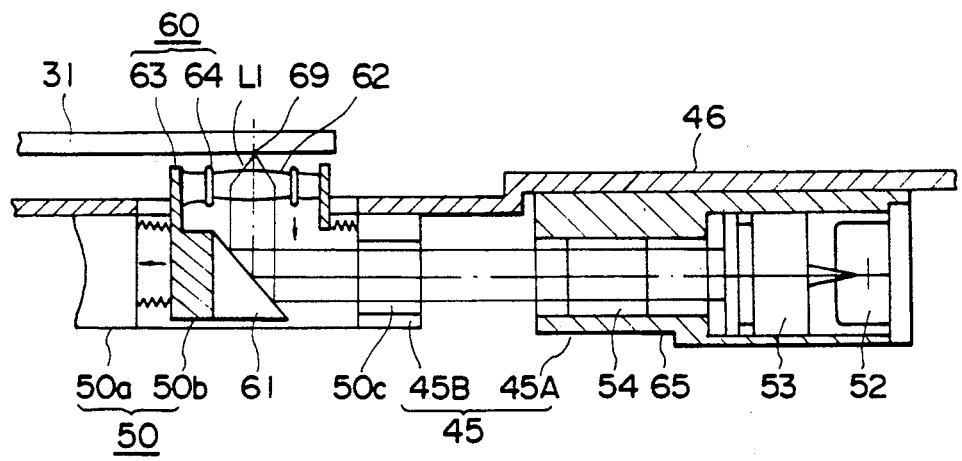
FIG. 6A
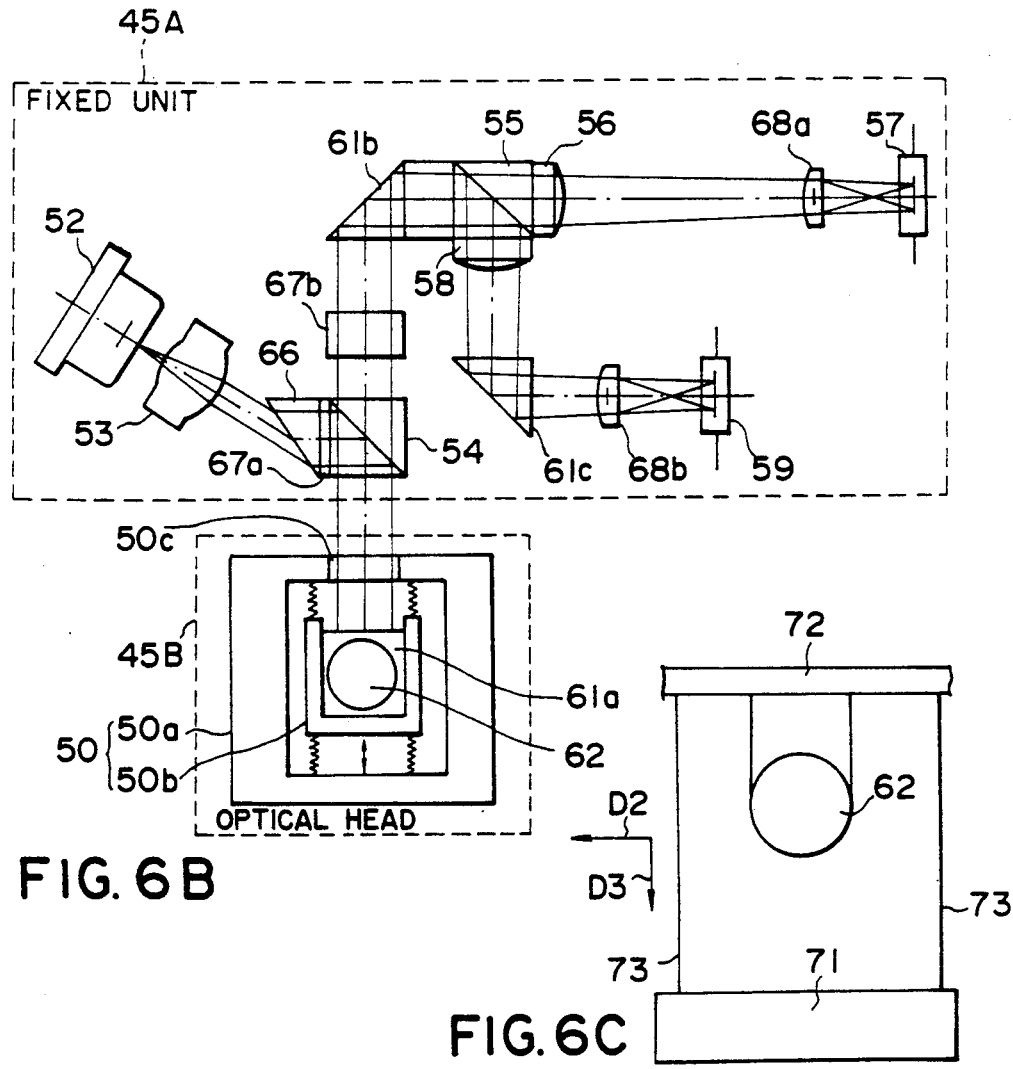
FIG. 6B
FIG. 6C

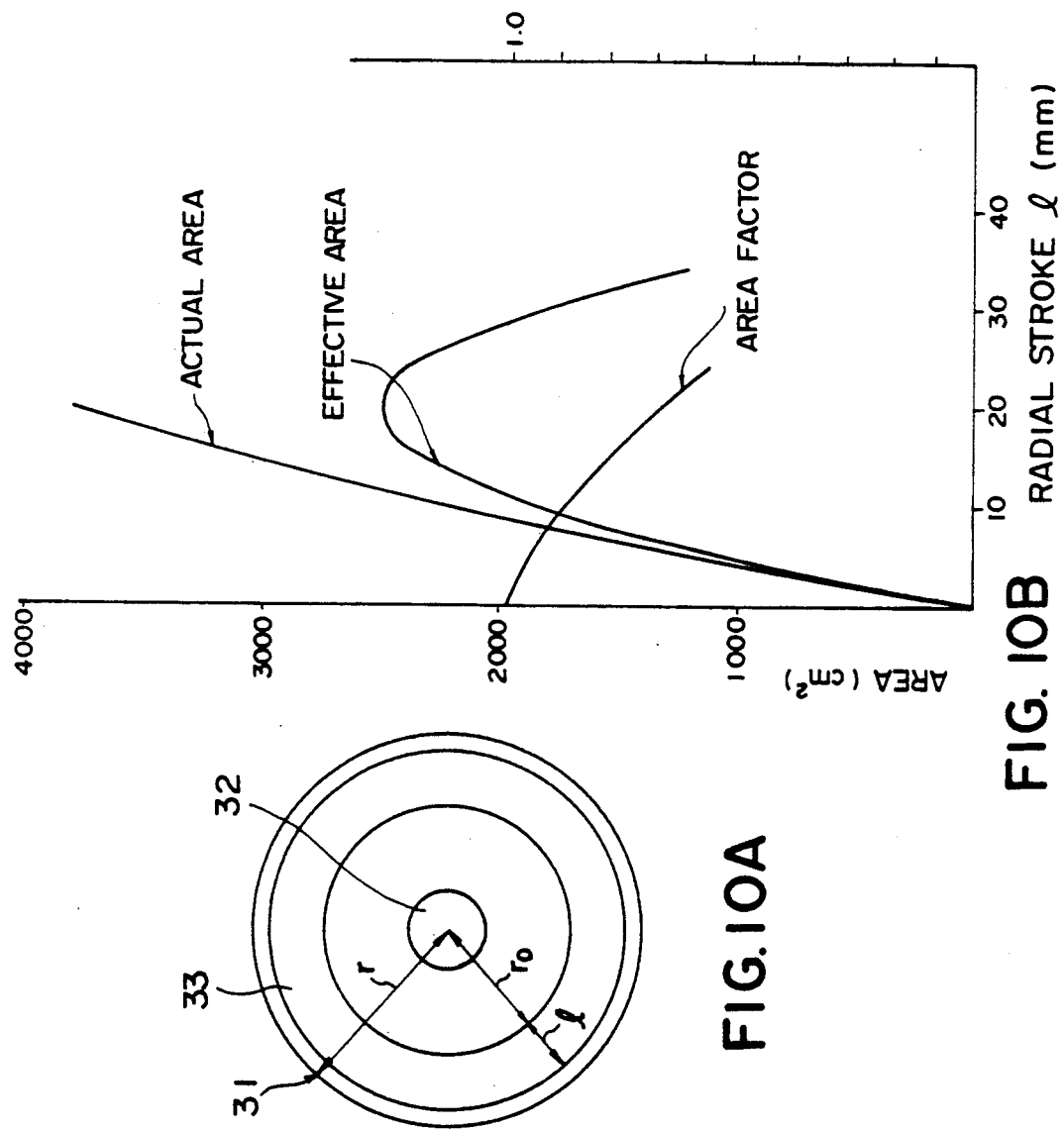

COMPACT OPTICAL DISC RECORDING/REPRODUCING SYSTEM

This application is a continuation of application Ser. No. 07/478,588, filed Feb. 12, 1990, abandoned.

BACKGROUND OF THE INVENTION

The present invention relates to a system for recording/reproducing information to/from a rewritable compact optical disc, and more particularly to a compact magnetooptical disc system for information recording/reproducing with a 2.5 inch magnetooptical disc cartridge for example.

Rewritable magnetooptical discs are used nowadays for computer data recording, document files and the like. In the following description, although a magnetooptical disc is used by way of example, other rewritable optical discs may be used as well. A rewritable optical disc cartridge used in the present system is constructed of an optical disc for recording/reproducing with optional erasure and rewriting, and a plastic case for housing the disc therein to facilitate its handling and detachable mounting to a recording/reproducing system. A rewritable optical disc has various sizes ranging from a large 12 inch type, 5.25 inch type to a small 3.5 inch type. Recently a 3.5 inch type disc has drawn attention as electronic apparatus tends to become more compact.

A conventional rewritable optical disc will be described in detail by using a 3.5 inch magnetooptical disk by way of example, while referring to FIG. 1. FIG. 1A is a plan view of a magnetooptical disc, and FIG. 1B is a partial enlarged cross section thereof.

As shown in FIG. 1B, a conventional 3.5 inch magnetooptical disc 1 has a circular substrate 1a made of transparent resin such as polycarbonate. There is formed on the substrate 1a a magnetooptical film (molybdenum (Mo)-film) 1b made of such as Iron (Fe), Cobalt (Co), Terbium (Tb), Gadolinium (Gd) for information recording/reproducing by means of the magnetooptical effect. There is further formed on the magnetooptical film 1b a protection film 1c made of such as ultraviolet hardened resin. At the center of the disc 1, a metal hub 2 is fixedly mounted for driving the disc. This disc is housed, as described previously, within a plastic case (not shown) to form a 3.5 inch magnetooptical disc cartridge.

The outer diameter S1 of the disc 1 is 86 mm. The outer diameter S2 of a record area 3 for information recording/reproducing relative to the magnetooptical film 1b is 80 mm, and the inner diameter S3 thereof is 48 mm. The record width W1 of the record area 3 in the radial direction is therefore 16 mm. Within the record area 3, there are formed 10667 spiral or concentric record tracks at 1.5 micron pitch. Each record track includes data areas for information recording/reproducing and management areas for management information storage, both areas being alternately disposed within the track.

The conventional 3.5 inch magnetooptical disc 1 is used by mounting it on a conventional 3.5 inch magnetooptical disc system shown in FIG. 2 which illustrates the recording/reproducing operation of the system.

As shown in FIG. 2, the conventional 3.5 inch magnetooptical disc system 5 is constructed of the 3.5 inch magnetooptical disc 1, base 4, electromagnet 6, feed device 7, optical recording/reproducing device 10, and so on.

The 3.5 inch magnetooptical disc 1 is rotated at a Constant Angular Velocity (CAV) of 3600 rpm by a spindle motor (not shown) fixed at the base 4, while the magnetooptical film 1b is applied with a bias magnetic field in the perpendicular direction by means of the electromagnet 6 which is disposed on the side of the protection film 1c and spaced therefrom by a gap. A laser beam L1 from the optical recording/reproducing device 10 is applied from the substrate side 1a to the magnetooptical film 1b for information recording/reproducing.

The optical recording/reproducing device 10 is constructed of a fixed unit 11 and an optical head 20. The fixed unit 11 is constructed of a laser diode 12, collimator lens 13, beam splitters 14 and 15, converging lenses 16 and 18, and photodiodes 17 and 19. The optical head 20 is constructed of a prism 21, objective lens 22, and focus servo actuators 23 and 24.

A laser beam radiated from the laser diode 12 is made parallel by the collimator lens 13 and shaped in a predetermined beam cross section by a beam shaping prism (not shown). The shaped laser beam is then applied via the beam splitter 14 to the prism 21. The laser beam L1 reflected by the prism 21 is formed into a light spot 25 of a small diameter by the objective lens 22 and applied to the surface of the magnetooptical film 1b on the record track of the record area 3 of the disc 1. The light spot 25 applied to the surface of the magnetooptical film 1b has a light intensity suitable for recording during a record mode of the device 10 and another light intensity suitable for reproducing during a reproducing mode. The light intensity is controlled by an output control device (not shown) for the laser diode 12.

During the recording mode, digital signals corresponding to the record data are recorded in such a manner that the perpendicular magnetization direction of the magnetooptical film 1b on the record track is reversed at the position where the light spot 25 is applied, with the aid of the bias magnetic field generated by the electromagnet 6.

During the reproducing mode, the rotation direction of the polarization plane of the laser beam reflected at the surface of the magnetooptical film 1b changes with the perpendicular magnetization direction thereof due to the magnetooptical effect. The laser beam with changed polarization plane then returns back to the objective lens 22 and prism 21 and is reflected by the beam splitter 14 and applied via a half-wave plate (not shown) to the polarizing beam splitter 15. The laser beam passing through the polarizing beam splitter 15 is converged by the converging lens 16 and converted into an electric signal by the photodiode 17 to be outputted as a detected signal. The laser beam reflected by the polarizing beam splitter 15 is also converged by the converging lens 18 and converted into an electric signal by the photodiode 19 to be outputted as a detected signal. The magnitude of both detected signals changes oppositely in accordance with the rotation direction of the polarization plane by means of the polarizing beam splitter 15, so that the digital signal can be reproduced in accordance with the difference between both detected signal outputs.

The fixed unit 11 of the optical recording/reproducing device 10 is fixed on the base 4. The optical head 20 is mounted on a movable section 9 of the feed device 7. The movable section 9 of the feed device 7 is moved in the radial direction D1 of the disc 1 by means of a linear motor 8 which is mounted on the feed device 7 fixed on the base 4. As a result, the light spot 25 is allowed to move within the range from the inner diameter circumference to the outer diameter circumference of the record area 3 so that the light spot performs a so-called feed operation to thereby search a record track. The base 4 is adapted to be held in position at a main chassis (not shown) of the device 10. As a countermeasure against surface vibration or the like of the disc 1, a so-called focus servo (in the direction of an arrow D2) for automatically moving the focal point of the light spot 25 on the surface of the magnetooptical film 1 is carried out by controlling the vertical position of the objective lens 22 with a focus servo actuator 23 in accordance with the detected signal outputs.

Furthermore, as a countermeasure against eccentricity of the disc 1, a so-called tracking servo (in the direction of an arrow D3) for automatically making the light spot 25 to trace the record track is carried out by moving the position of the objective lens 22 in the radial direction of the disc 1 with a tracking servo actuator 24 in accordance with a signal output detected from the management area. The range of tracking of the light spot 25 in the radial direction of the disc 1 with the tracking servo has in general a limit of about ±1 mm. Therefore, the positioning of the light spot 25 in the radial direction of the disc 1 is carried out precisely by the tracking servo (arrow D3) and coarsely by the feed operation (D1).

If the conventional 3.5 inch magnetooptical disk system 5 constructed as above is mounted in a battery driven portable personal computer which is a typical example of personal use, there is a problem of a large outer dimension of the system 5a, and also of a large weight not suitable for portable use. There is another problem of a large power consumption of a battery.

SUMMARY OF THE INVENTION

The present invention has been made in consideration of the above problems which are solved by the invention while positively utilizing the characteristic features of a magnetooptical disc.

It is an object of the present invention to provide an optical disc recording/reproducing system for information recording/reproducing with a 2.5 inch magnetooptical disc cartridge for example.

It is another object of the present invention to provide an optical disc recording/reproducing system capable of simplifying the optical recording/reproducing device and allowing a high speed access by using an optical disc of a small diameter having a limited record track width.

In order to achieve the above objects, the optical recording/reproducing system of this invention comprises a spring capable of displacing an objective lens and optical path changing mirror at least in the track feeding direction; an actuator performing a desired track selection and tracking operation by means of the displacement of the spring; a pickup for information recording/reproducing of an optical disc; and an optical disc having a recording/reproducing storage area only within the range where the actuator can access.

More in detail, the optical disc recording/reproducing system comprises a load/eject device for removably positioning at a predetermined recording/reproducing position a compact magnetooptical disc cartridge which houses therein a magnetooptical disc having a record area width equal to or smaller than 9 mm; an electromagnet having a bias magnetic field generating section for applying a bias magnetic field to the record area of the magnetooptical disc; an electromagnet setting device for removably setting the electromagnet at the predetermined recording/reproducing position; a rotary drive device for rotatively driving the magnetooptical disc at a predetermined angular velocity; an optical recording/reproducing device for information recording/reproducing relative to the disc record area, the optical recording/reproducing device including a fixed unit disposed at the retracting or stand-by position of the disc cartridge, and a optical head including a tracking servo actuator which performs both feed operation and tracking servo operation, the fixed unit having a light emitting element for radiating at least a laser beam and a light receiving element for obtaining a detection signal in accordance with a reflected light from the magnetooptical disc, the optical head being disposed along the optical axis of a light beam from the fixed unit and movable in the disc radial direction to search the record area; a base for mounting at a surface area thereof the load/eject device, electromagnet and electromagnet setting device and fixing at another surface area thereof the rotary drive device, and the fixed and optical heads of the optical recording/reproducing device; wherein the optical axis direction toward the light receiving element is adapted to be changed in the direction perpendicular to the optical axis direction between the fixed and optical heads and parallel with the other surface area of the base, and wherein the distance between the optical axis between the fixed and optical heads and the other surface area of the base at which the optical head is fixed, is adapted to become approximately equal to or smaller than a half of the outer dimension of the light receiving element.

BRIEF DESCRIPTION OF THE DRAWINGS

The invention will now be described in detail with reference to the accompanying drawings,, wherein:

FIG. 6A to 6F are schematic diagram showing parts of the optical recording/reproducing device of the system shown in FIG. 3;

DETAILED DESCRIPTION OF THE PREFERRED EMBODIMENTS

Figure 1A:
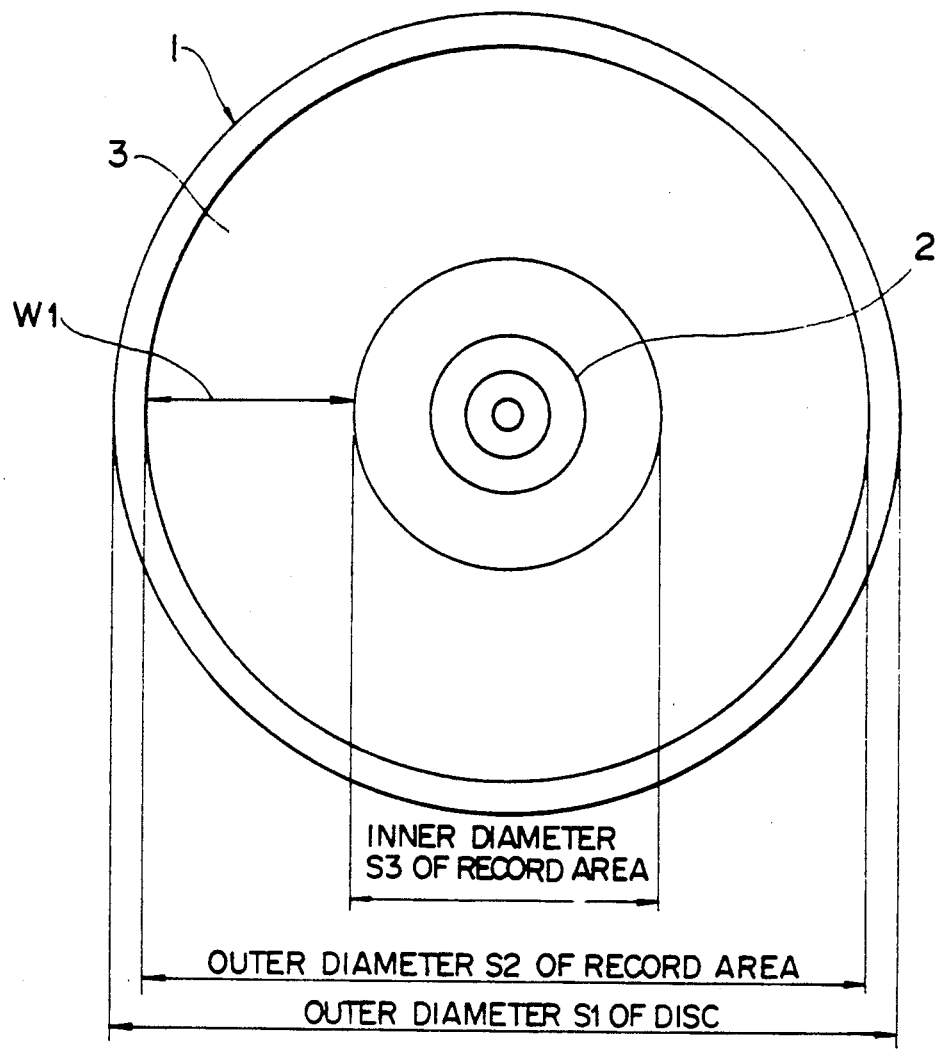
FIG. 1A is a schematic diagram which shows an example of the structure of a conventional prior art 3.5 inch magnetooptical disc.
Figure 1B:
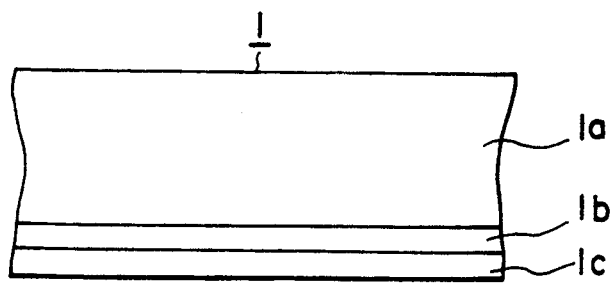
FIG. 1B is an enlarged partial elevational view showing the edge of the disc of FIG. 1A.
Figure 2:
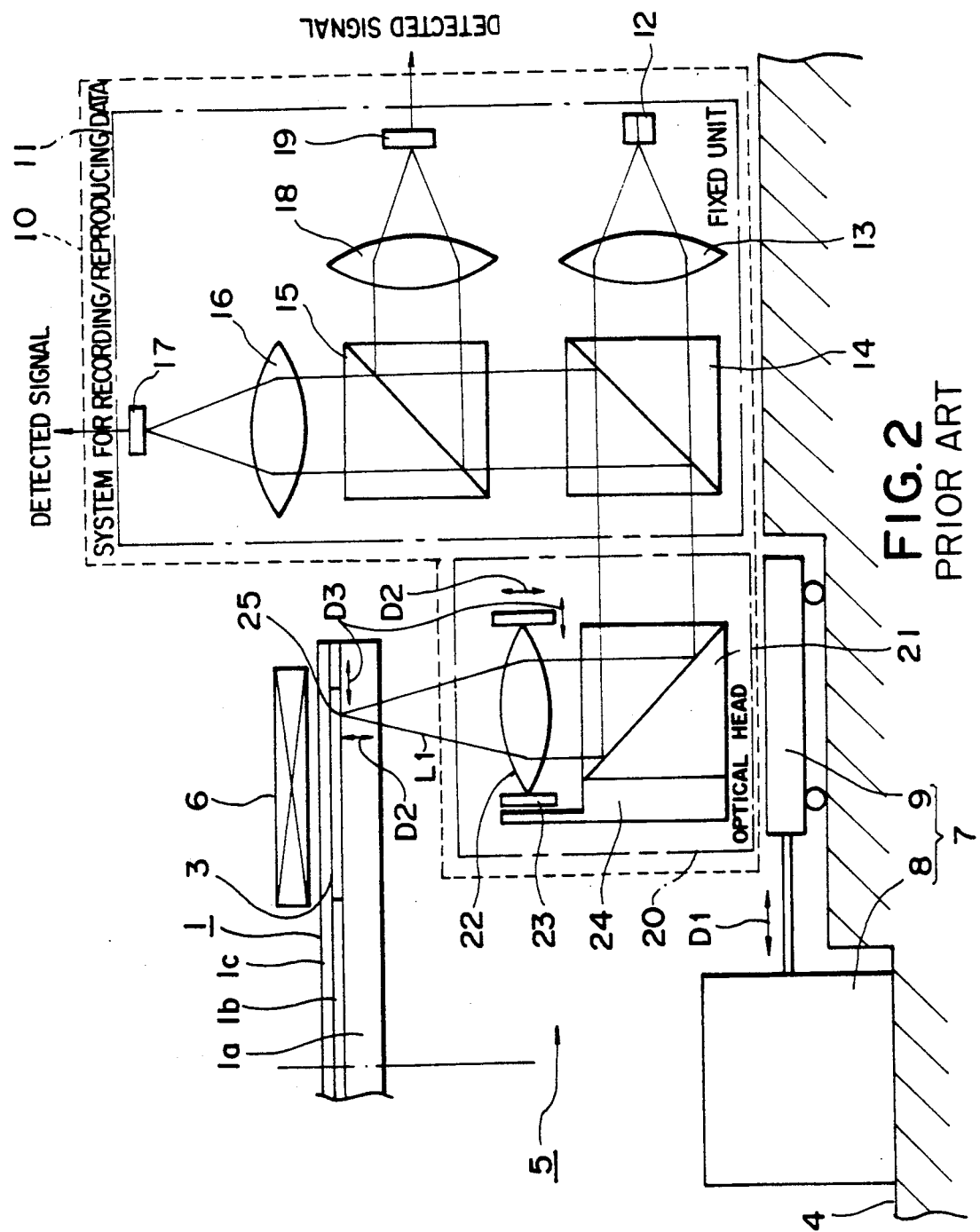
FIG. 2 is a schematic diagram which illustrates the recording/reproducing operation of a conventional 3.5 inch magnetooptical disc system.

Prior to describing the embodiments of this invention, the basic principle, summary and other subjects of this invention will be first given.

HIGH-SPEED ACCESS

In order to improve the high-speed access intimately related to the performance of an optical disc, it has been attempted to lighten the weight of the optical pickup and to allow large output and improved control of a linear motor.

In order to reduce the weight of a pickup, there is a tendency to adopt a so-called separated optical system wherein the optical system heretofore integrated with the pickup is separated therefrom to a fixed unit, and where an optical head has only those drive elements necessary for information reading, focussing and tracking.

This invention relies on the concept that the system should be made compact first of all as small as peripheral devices while positively utilizing the features inherent in an optical disc. Conventionally, the feed system and tracking system have been driven by using different actuators to cover high speed operation for large stroke, and high speed and response for small stroke, respectively. According to the present invention, the tracking and accessing are driven by using a single actuator to carry out control operation time divisionally. The fundamental concept of a single actuator of this invention leads to a limited information record area of a disc, which the actuator can access With such an arrangement, the optical head has those elements necessary for driving an objective lens in the focussing and tracking directions, the elements including a lens, flat spring, intermediate members and the like, the weight of which is several grams in total. In the case of a suspension type actuator, the optical head has an objective lens, focussing flat spring and coil, tracking flat spring and coil, driving prism, support member such as prism support beam, and the like. In the case of a linear motor type actuator, the optical head has an objective lens, focussing flat spring and coil, tracking coil, driving prism, support member such as prism support beam, bearing, and the like. In both cases, the weight of the optical head is several grams. It is therefore possible to realize an information recording/reproducing system which has low power consumption, high speed access, large memory capacity, high reliability and stability, and which is compact and non-contact.

SERVO SYSTEM

The invention has adopted a sample/hold system for tracking servo because a servo system having a high compatibility between medium and drives is required in order to allow replacement with ROM type discs and RAM type discs, which is the characteristic feature of an optical disc. The main features among various features of the sample/hold system are as follows:

(1) Tracking signals are not influenced by recording signals.

(2) The sample/hold system is equivalent to the three-spot system widely used with CD, in tracking stability. The disadvantages inherent in the push-pull method can be eliminated, such as a beam offset error (error caused by a reflection light which divisionally moves on the photosensor as the objective lens moves), a disc skew error (error caused by a reflection light which displaces upon the tilting of a disc surface), and other errors. The push-pull method has a large DC offset fluctuation of a tracking signal caused by the beam offset error and disc skew error.

(3) A focussing signal is detected at the mirror surface so that it is not influenced by an address signal and a tracking signal.

(4) A differential method is used in detecting a signal so that C/N degradation hardly occurs.

(5) A servo pit is used for synchronization so that it operates as a limiter for error propagation.

The above-described main features have been adopted as the technical factors constituting the fundamentals of this system.

While taking into consideration the exchangeability of a magnetooptical disc used with note-type personal computers or lap-top computers, the capacity of the disc has been determined as 40 MB aiming at compact, low power, and battery driven discs. The capacity of 40 MB is as large as HDDs larger than large FDDs, which is sufficient when the exchangeability of a disc is taken into consideration.

Since the recording area of the disc becomes narrow, the space occupied by the read/write pickup and bias electromagnet becomes as narrow as 6 mm, thus facilitating the realization of a compact system. Conventionally, the access drive mechanism has been controlled by two steps. However, according to this invention, with a broader movable range of an actuator, one step control is possible. Two step control requires two control and drive system. In addition, in some type of actuators, an objective lens is subjected to acceleration by the feed control during high-speed access and is displaced from the neutral position by the inertia force, so that in order to avoid this there is required to additionally provide a lens position detection unit and control unit or inertial force correction, and the like. These additional elements are not necessary for the case of one step control, so that the system mechanism becomes simple like HDDs and the like, with a reduced movable range, high speed, and power conservation.

FUNDAMENTAL RECORDING/REPRODUCING/ERASING OPERATION OF MAGNETOOPTICAL DISC SYSTEM

The recording operation sequence of a magnetooptical disc drive is related to the performance of drivers.

Since an optical disc medium has more defects than HDD medium, it is necessary to add an error correction code and verify the data immediately after writing.

The operation of the drive under such circumstances will be described. A magnet for magnetooptical recording bias remains at a predetermined position during an ordinary case because no bias magnetic field is required. The fundamental recording steps include:

(1) reversal of magnet (setting initializing magnetic field)
(2) erase operation
(3) reversal of magnet (setting recording magnetic field)
(4) recording operation
(5) verification When defects are detected in step (5), a replace process step is added to the above steps. The above steps are performed for each revolution of a disc if the operation sequence is carried out on the one track unit basis.

The power level of the semiconductor laser is set at 1 mW during the reproducing operation, 10 mW during the erasing operation, and 8 mW during the recording operation.

The operation sequence is not limited to the above, but various modifications are possible depending upon the design concept of a controller, such as a buffer memory capacity of the drive.

STRUCTURE OF MAGNETOOPTICAL DISC SYSTEM

Figure 7:
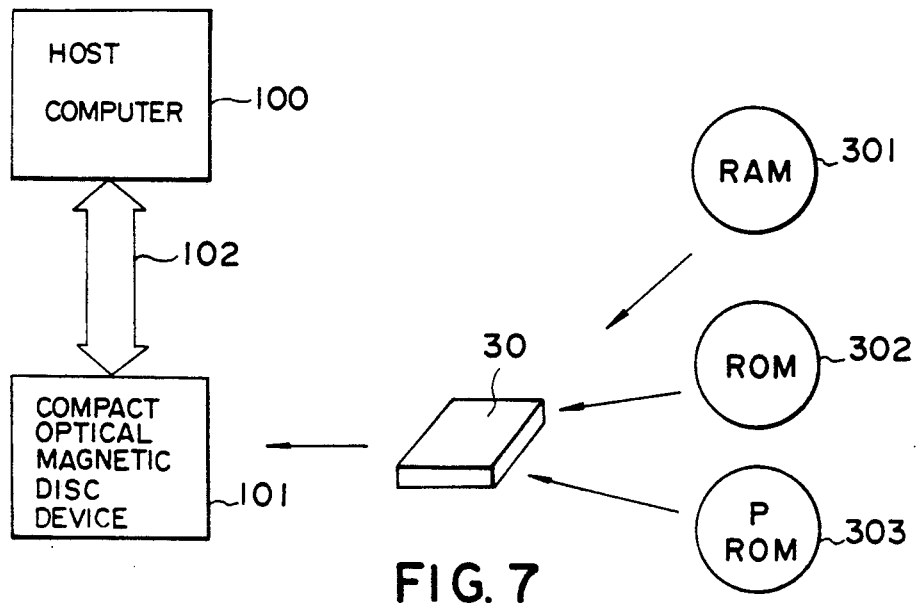
FIG. 7 is a diagram showing the concept of the compact magnetooptical disc system according to this invention.

The structure of a magnetooptical disc system is shown in FIG. 7 which will be described later in more detail.

In FIG. 7, the system is constructed of a host computer 100, a drive 101, a medium 30, and an interface 102 of a particular specification between the computer 100 and drive 101. This host interface 102 may be an SCSI interface bus or a PC/AT interface bus via which data is transferred in a format specific to particular hardwares and logics. The drive includes a controller for the interface 102, the controller converting the logical format from the host 100 into a physical format.

The drive 101 and medium 30 are standardized in accordance with a particular disc specification and cartridge specification. The types of a disc 30 include a RAM type disc 301 for data recording/reproducing, a ROM disc type disc 302 for reproducing only, and a P-ROM (Partial ROM) type disc 303 for partial data writing. A presently used medium is of a non-overwritable type. The technical development in this point results in three types of non-overwritable type, overwritable type, and reproducing-only type. Such a disc 30 is housed within a cartridge so as to facilitate mounting to the drive and to protect it from scratches and dusts.

It is now assumed that the host activates an operating system (OS) and runs an application program stored in a disc of this invention. The disc is inserted into the drive and the application program starts running. On the basis of the OS data management system and commands, an information request command and logical address (information write command and logical address) are sent via a device driver and host interface to the driver. The controller analyzes the command, converts the logical address into a physical address of the disc, and sends a seek and read instruction (data of a read instruction and error correction code) for a read (write) track to the deck. The deck causes the optical system to move, and reads the data in the disc and sends it to the controller (in writing, data is modulated and then written). The controller corrects errors of the read-out data, and then sends it via the host interface to the host. The program runs in the above manner to perform recording/reproducing of the disc.

In personal use of the magnetooptical disc cartridge, there are various applications such as (1) a user writes information in a data area of a new disc, and reproduces the information so recorded, (2) a user reproduces the recorded information of a disc available from the market, (3) a user writes information in an empty area of the data area of a disc in which information has been already recorded.

If the overall dimension of a compact magnetooptical disc system for recording/reproducing by using a magnetooptical disc cartridge for personal use is made half the standard 3.5 inch hard disc system (width 4 inches, depth 5.8 inch, height 1 inch) built-in a conventional personal computer, then two magnetooptical disc systems can be mounted in the space of a single 3.5 inch hard disc system, to thereby improve the operability of the computer. In this case, a combination of a hard disc system and the compact magnetooptical system of this invention may be used, thereby providing both the merits of the high speed data transfer of the hard disc system and the exchangeability of the compact magnetooptical disc system. The width of the magnetooptical disc system may be set at 2.9 inch, the depth at 4 inches, which are half that of the 3.5 inch hard disc system, and the height at 1 inch same as the hard disc system. With the above dimension of the compact magnetooptical disc system, it becomes necessary to set the width of a corresponding disc cartridge at about 2.5 inch.

According to the compact magnetooptical disc system of this invention, a magnetooptical disc cartridge is used wherein a magnetooptical disc having a record width equal to or narrower than 6 mm is housed in a square case with about 2.5 inch side. The overall dimension of the system can be therefore set at the above-described values (width 2.9 inch, depth 4 inches, and height 1 inch), to thereby realize a compact, light weighted, and low power consuming system.

Figure 4A:
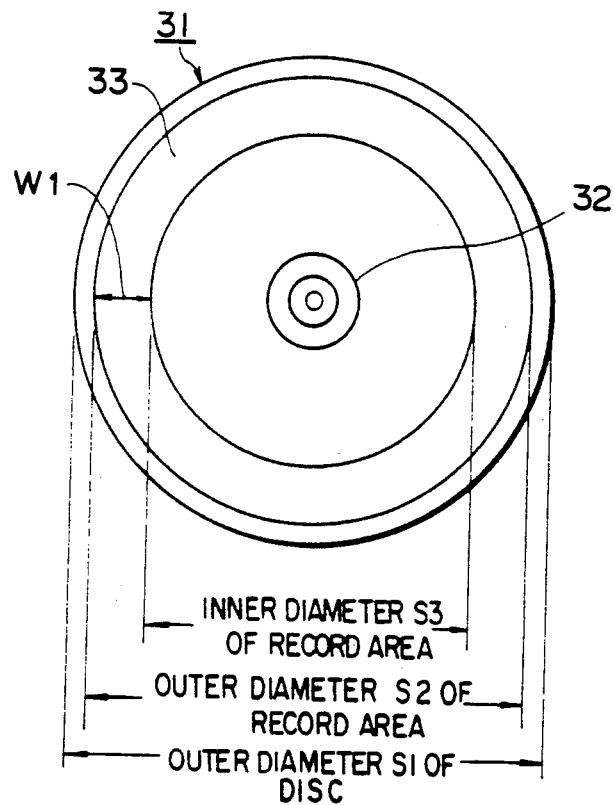
FIG. 4A is a schematic diagram showing a plan view of a 2.5 inch magnetooptical disc cartridge used with the system shown in FIG. 3.
Figure 4B:
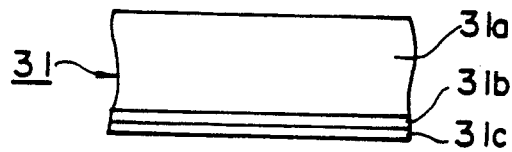
FIG. 4B is a view similar to FIG. 1B of a 2.5 inch disc used in the invention.
Figure 4C:
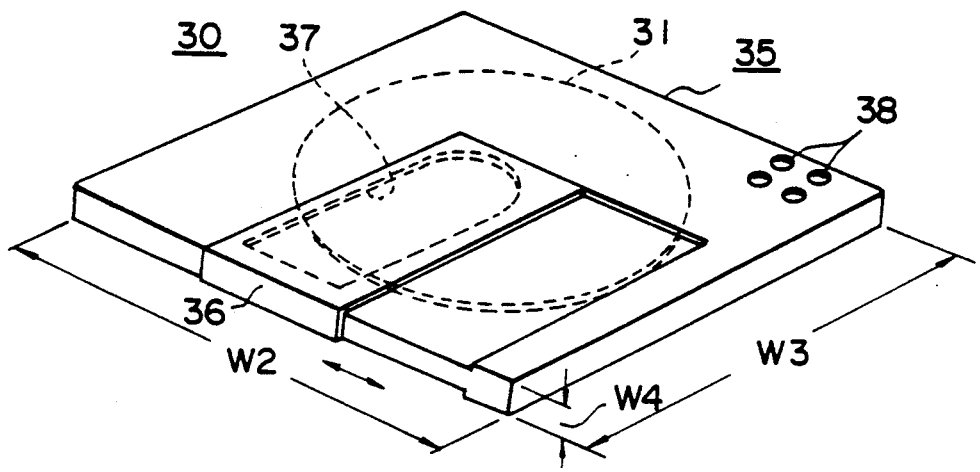
FIG. 4C is a perspective view of a cartridge for the disc of FIg. 4A.

FIGS. 4A to 4C show the structure of a 2.5 inch magnetooptical disc cartridge used in the present system. FIG. 4A is a plan view of a 2.5 inch magnetooptical disc, FIG. 4B is an enlarged partial cross section of FIG. 4A, and FIG. 4C is a perspective view of the 2.5 inch magnetooptical disc cartridge. As shown in FIGS. 4A to 4C, the 2.5 inch magnetooptical disc 31 is substantially the same as the conventional 3.5 inch magnetooptical disc 1 shown in FIG. 1A except for a different outer dimension and record area width and other points. The description for like parts to those shown in FIG. 1A is omitted.

The 2.5 inch magnetooptical disc cartridge 30 is composed of the disc 31, case 35, shutter 36 and the like.

Similar to the conventional disc, the 2.5 inch magnetooptical disc 31 is constructed of a substrate $31a$, magnetooptical film (Mo film) $31b$, protection film $31c$ all laminated one upon another, with a hub 32 being fixedly formed at the central portion thereof. The outer diameter S1 of the disc 31 is 61 mm, the outer diameter of the record area 33 of the magnetooptical film $31b$ is 57 mm, and the inner diameter S3 is 45 mm, so that the record width W1 is 6 mm. Within the record area 33, 400 spiral or concentric record track turns (not shown) are formed at 1.5 micron pitch. The rated record capacity is 40 MB which is compatible with the capacity of 20 to 40 MB suitable for personal use.

It is necessary to consider the matching of a peripheral device with an OS of a computer for personal use. As an OS for personal computers, MS-DOS is widely used with a great number of software resources. MS-DOS controls data management for peripheral devices in units of cluster, and the data management capacity is determined by a bit size of FAT which manages clusters. The bit size, however, is different for each MS-DOS version. Version 2.0 uses 12 bits allowing the management of 4085 clusters, version 3.0 uses 16 bits allowing the management of 65525 clusters. If data of 20 to 40 MB is managed by version 2.0, the cluster sizes are 8 k and 16 kB so that even 1 kB data is managed using such cluster sizes, which is wasteful from the standpoint of memory capacity. Version 3.0 can manage data up to 65 MB by using 1 kB size. A large capacity optical disk manages data as a plurality of virtual drives so that a plurality of management data sections are required resulting in poor efficiency. From these points, the data size suitable for one drive is equal to or smaller than 60 MB.

It is necessary from the above view point to determine the format while aiming at a drive which handles about 40 MB. Presently being studied is the possibility of a format compatible with the 3.5 inch disc format The 3.5 inch format uses the record area starting from the inner radius of 24 mm. The parameters used are 22 sectors, minimum recording wavelength of $\Lambda = 0.82$ micron, and track pitch of 1.5 micron. The record area width satisfying the total data quantity 43 MB is 5.58 mm so that the maximum outer radius becomes 29.5 mm, disc outer diameter 63 mm (2.48 inch). The 3.5 inch disc cannot be therefore housed within the 2.5 inch disc cartridge. The disc outer diameter suitable for the 2.5 inch disc cartridge is 61 mm, the maximum record radius 28.5 mm, the record area minimum inner diameter 23 mm, and the recording wavelength 0.8 micron or shorter, thereby not ensuring a satisfactory signal quality. From the above points, it is difficult to realize the 2.5 inch format compatible with the 3.5 inch format.

The following format has been determined in view of the above consideration. Specifically, for the rated memory capacity of 40 MB aiming at 20 to 40 MB suitable for personal use, the necessary memory capacity becomes 43 MB inclusive of the management data area, defect replacement area, and other areas. Assuming that the user data capacity per sector is 512 bytes and that the number of sectors per one record track is an optimum value 21 near a conventional value 22, then the number of record tracks is given as follows:

$$\text{total number of tracks} = 43 \text{ MB}/512 \text{ bytes} \times 21 \doteq 4000 \text{ tracks} \quad (1)$$

The pitch of record tracks is set at 1.5 micron as conventional. The record area width which is a product of the track pitch and the number of the track turns, is given by:

$$\text{record area width} = 4000 \times 1.5 \text{ micron} = 6 \text{ mm} \quad (2)$$

With the sector number of 21, segment number per sector of 67, and one segment of 11 bytes including two byte servo area and 9 byte data area, if a 4/11 modulation is used as conventional, the minimum recording wavelength at the record area inner diameter S3 of 45 mm is given by the following because the wavelength is equal to the minimum recording pit length representative of one bit at the minimum inner record track:

$$\text{Minimum recording wavelength} = \quad (3)$$

$$\pi \times 45 \text{ mm}/21 \times 67 \times 11 \times 11 \doteq 0.82 \text{ micron}$$

With this minimum recording wavelength of 0.82 micron, the C/N ratio at the record area inner diameter S3 of 45 mm can be 45 dB or more while taking into account the double refraction at the substrate 1c.

During the tracking servo in a recording/reproducing system, the position correction of the disc cartridge 30 is performed in the radial direction by using a servo pit previously formed in the servo area provided at the top of each segment of a record track of the disc 31, and the data area following the servo area relies upon free running or a so-called sample/servo method. The number of servo samples which is the number of servo areas per one record track, is given by:

$$\text{servo sample number} = 21 \times 67 = 1407 \quad (4)$$

This servo sample number 1407 is an intermediate value between 1372 for the 5.25 inch type and 1672 for the 3.5 inch type, posing no practical problem.

Figure 9:
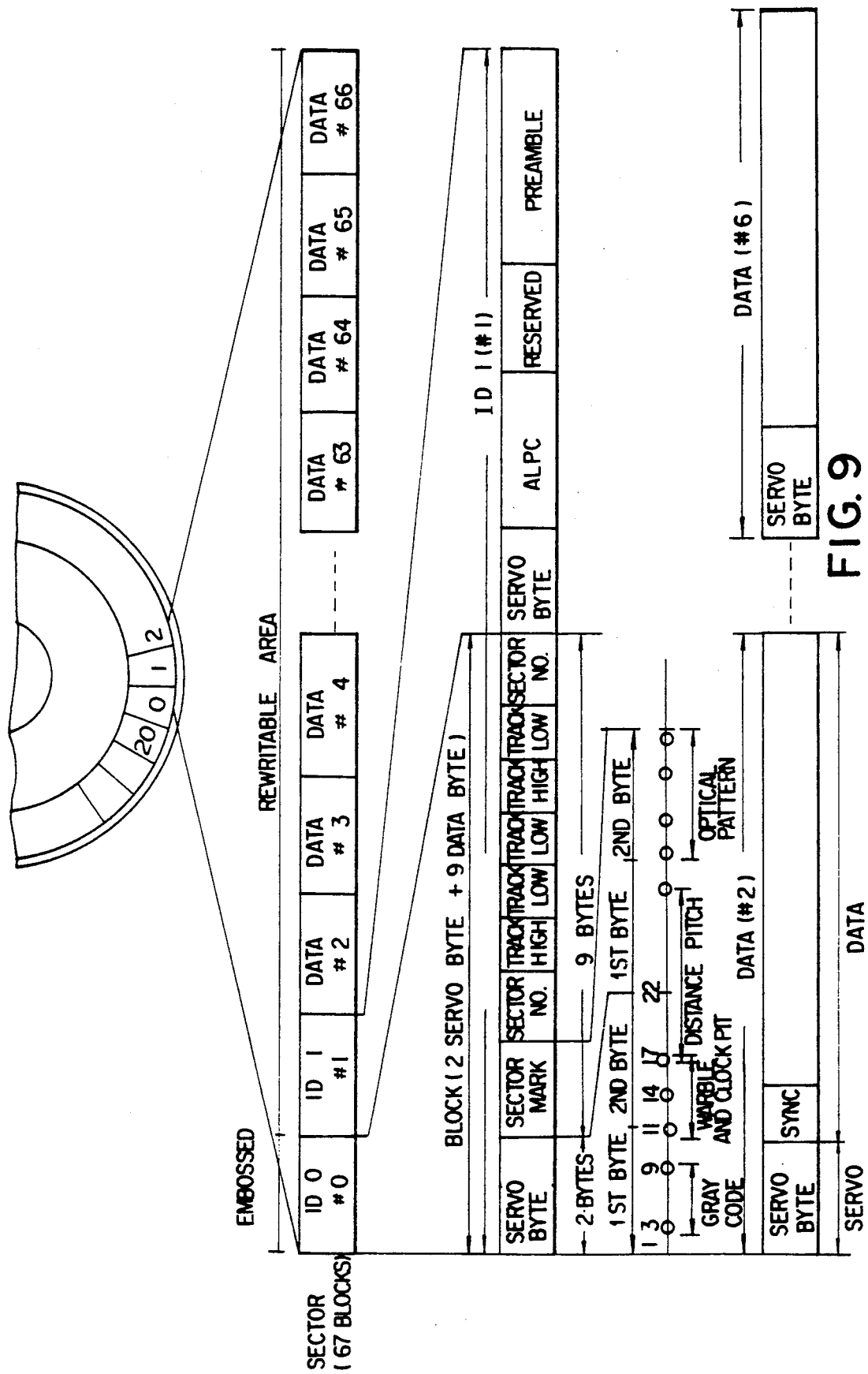
FIG. 9 is a diagram used for explaining the format of the magnetooptical disc shown in FIG. 4.

The format described so far is shown in FIG. 9. One track is constructed of 21 sectors, and one sector is constructed of 67 blocks. The initial block is for an embossed signal, and the first to 66-th block are for the rewritable areas. One block is constructed of 2 servo bytes and 9 data bytes. The two blocks at the start of the sector constitute a header including a sector mark, sector number, track number, laser power adjustment area, and preamble.

The disc 31 is housed within a case 35 made of resin. The width W2 of the case is 64 mm, depth W3 68 mm and height W4 5 mm. An opening 37 is formed in the case near the center thereof on the side of the record area 33 extending from the record area 33 to the hub 32. Another opening (not shown) is formed on the rear side of the record area at the position corresponding to the record area 33. Both the openings are shut by the shutter 36 when the disc cartridge 30 is not used, and are exposed by sliding the shutter 36 in the direction indicated by an arrow when it is used.

This case 35 is formed with a recording/reproducing control information record section 38 in the form of a through hole at predetermined positions at one corner of the case 35. The recording/reproducing control information used at the time of information recording/reproducing includes, for example, the information whether the magnetooptical film 31b is an overwritable film or a non-overwritable film, the information whether the record track is single density or double density, and other information.

This case 35 is also formed with a write protect information record section (not shown) in the form of through hole.

Figure 3A:
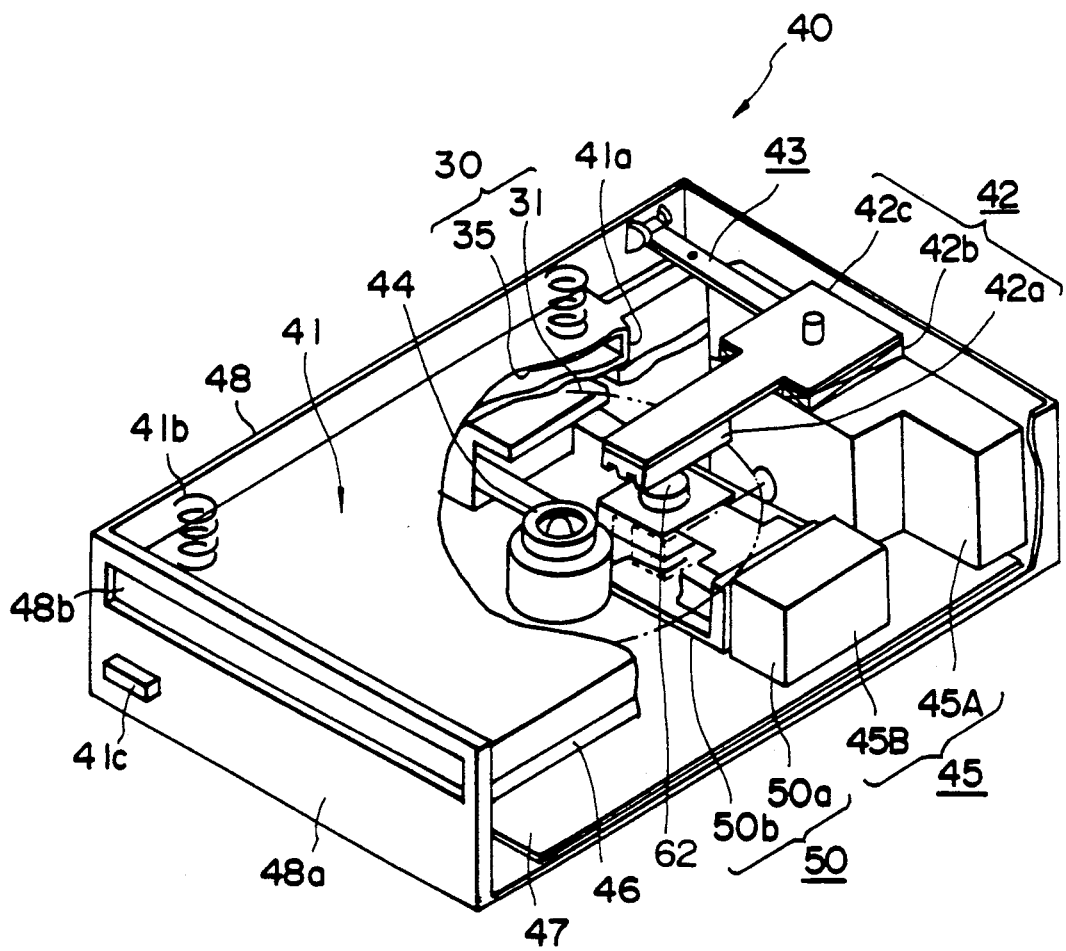
FIG. 3A is a schematic diagram in perspective showing the structure of a 2.5 inch magnetooptical disc system according to an embodiment of the compact magnetooptical disc system of this invention.
Figure 3B:
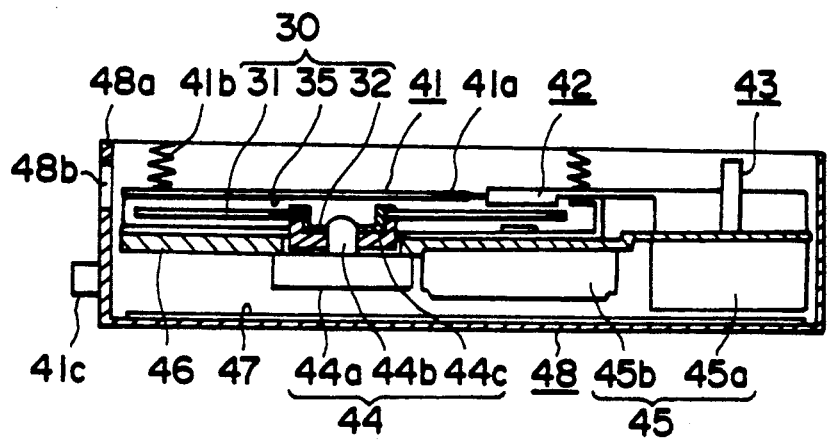
FIG. 3B is a partial cross-sectional view taken along line 3B—3B of FIG. 3A.

When the 2.5 inch magnetooptical disc cartridge 30 constructed as above is used, it is mounted within a 2.5 inch magnetooptical disc system 40 of the present embodiment shown in FIG. 3A and 3B.

FIGS. 3A and 3B are schematic diagrams showing an embodiment of the 2.5 inch magnetooptical disc system according to the present invention. FIG. 3A is a perspective view with the upper portion partially broken, and FIG. 3B is a cross sectional side view.

The 2.5 inch magnetooptical disc system 40 is constructed of the 2.5 inch magnetooptical disc cartridge 30, load/eject device 41, electromagnet 42, electromagnet up/down device 43, rotary drive device 44, optical recording/reproducing device 45, base 46, electronic circuit board 47, chassis 48 and the like.

The disc cartridge 30 is inserted by a user from a cartridge inlet 48b at the front panel 48a of the chassis 48 into a cartridge case 41a of the load/eject device 41. The cartridge case 41a is slightly larger than the case 35 of the disc cartridge 30, and the opening end thereof is in contact with the cartridge inlet 48b. As the disc cartridge 30 is pushed and inserted within the cartridge case 41a, the shutter 36 is caused to slide laterally by a shutter opening/closing device (not shown) so that the openings are exposed. When the disc cartridge 30 is manually inserted to the deepest position of the case 41a, a lock mechanism (not shown) is released by the force exerted by the disc cartridge against the force of a spring 41b, the lock mechanism holding the case 41a at the lower position by means of the spring 41b. Upon release of the lock mechanism, the case 41a and hence cartridge 30 goes down and is positioned at a predetermined recording/reproducing position by a positioning device (not shown) mounted on the upper surface of the base 46. The hub 32 of the cartridge 30 is chucked, via the opening of the cartridge case 41a and the opening 37 of the cartridge 35, at a drive hub 44c of a spindle motor 14a of the rotary drive device 44 fixed at the lower surface of the base 46, by an attraction force of a chucking magnet (not shown) built in the drive hub 44c. The drive hub 44c is fixed at a drive shaft 44b which projects upward via a hole in the base 46. The magnetooptical disc 31 is therefore held in position not in contact with the inner wall of the cartridge 35. The hub 32 and hence the magnetooptical disc 31 is rotated at CAV 3600 rpm by the rotary torque of the spindle motor 44a.

The electromagnet 42 is constructed of a bias magnetic field generating section 42a, a coil 42b for supplying magnetic flux to the bias magnetic field generating section 42a, a yoke 42c coupling the bias magnetic field generating section 42a and yoke 42c, and the like. The coil 42b is positioned deeper than the cartridge case 41a in the direction of inserting the magnetooptical disc cartridge 30.

When the cartridge case 41a is at the initial position, the bias magnetic field generating section 42a is at a stand-by position above the cartridge case 41a. When the cartridge case 41a lowers, the electromagnet up-/down device 43 is actuated so that the bias magnetic field generating section 42a lowers by the distance longer than the downward motion of the cartridge case 41a. As a result, the bias magnetic field generating section 42a is set, through the opening of the cartridge case 41a and the opening of the case 35, at the predetermined recording/reproducing position with a clearance to the upper surface of the magnetooptical disc 31 being maintained about 0.6 mm.

The fixed unit 45A of the optical recording/reproducing device 45 is fixed at the lower surface of the base 46 at the position deeper than the cartridge case 41a in the direction of inserting the magnetooptical disc cartridge 30. The optical head 45B of the optical recording/reproducing device 45 is fixed at the lower surface of the base 46 and under the cartridge case 41a at the position corresponding to the fixed unit 45a. The objective lens 62 faces the record area 33 of the magnetooptical disc 31 via the opening of the case 41a and the opening 37 of the cartridge 35. The objective lens 62 is held in position at the central portion of a movable section 50b which is mounted at the middle of the tracking servo actuator 50 of the optical head 45B.

The recording/reproducing control information record section 35b of the cartridge 35 is read with an optical reader (not shown) to adjust the recording/reproducing system in accordance with the recording/reproducing control information.

The central portion of the record area 33 in the radial direction, which is a mechanically stable position of the tracking servo actuator 50, starts being read with the optical recording/reproducing device 45. In accordance with the read-out position information, a desired position of the record area 33 starts being recorded/reproduced as will be described later.

Electronic circuits for recording/reproducing such as various control circuit, drive circuits, data signal processing circuits, interface circuits and the like are implemented on the electronic circuit board 47 mounted at the bottom of the chassis 48.

Figure 8:
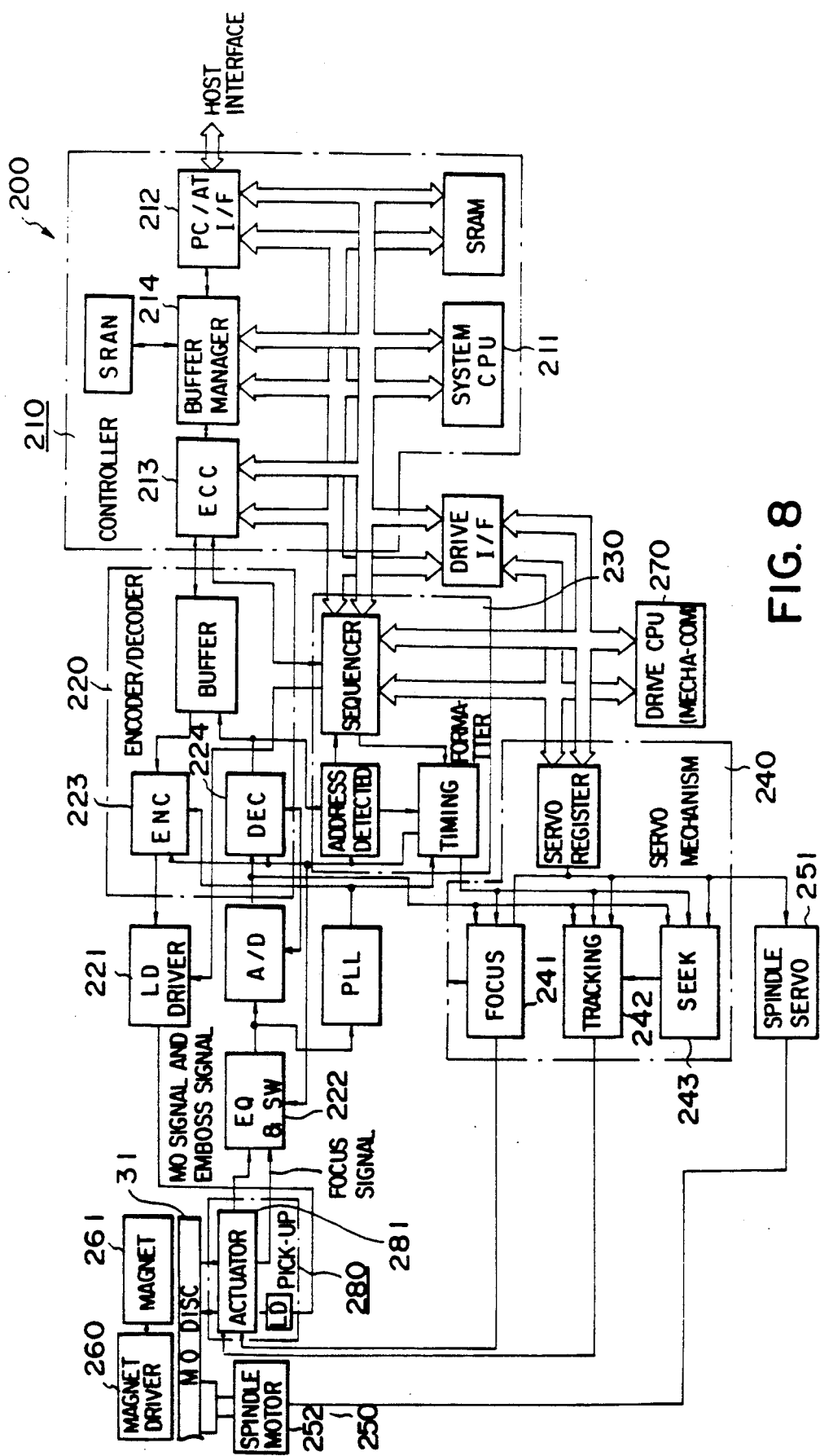
FIG. 8 is a block diagram of the system shown in FIG. 3.

The structure and operation of the drive will be described in connection with its electronic circuit while referring to the functional block diagram shown in FIG. 8.

A drive 200 has a host interface to a computer. Such an interface is known as PC/AT, and SCSI. The host interface is connected to a controller 210 of the drive 200.

The main constitutional elements of the drive 200 are a signal system 220 (LD drive system 221, equalizer system 222, modem system 223, 234), formatter system 230, servo system 240, control system 210, spindle system 250, and bias magnet system 260.

In the signal system 220, digital data is modulated in a manner suitable for the disc characteristic and recorded in the disc, and signals reproduced from the disc are demodulated while passing them through the equalizer system.

The formatter system 230 receives an instruction from the controller 210 and sends it to the microcomputer 211, transmits address data received from the disc 31, and performs signal control operations. The servo system 240 controls the spot in accordance with a surface fluctuation and eccentricity by using a focussing servo system and tracking servo system 242, and also performs a seek 243 operation relative to a target track in response to an access instruction.

The controller system 210 is constructed of a host interface 212, ECC 213 and buffer manager 214.

The host interface 212 communicates with the host via a host bus.

ECC 213 adds an error correction code to recording data, and compares written data with the reproduced data during a verification operation to thereby judge if a replacement process is needed.

The buffer manager 214 accesses a buffer RAM, and transfers data at high speed between ECC 213 and the host interface 212.

The bias magnet system 260 generates a magnetic field for recording and erasing.

When the cartridge 30 is inserted into the drive, the shutter of the cartridge is opened by the shutter opener and the cartridge is mounted at a predetermined position. The mounting condition and type of a disc are detected by a cartridge sensor and ID hole sensor, and the results are informed to a mecha-com 270.

The control by the mecha-com 270 then starts. The main operations of the drive 200 are (1) motor start, (2) stand-by, (3) read, (4) write, (5) erase, (6) and seek. The operations (1) and (2) are performed by the mecha-com. The operations (3) to (6) are controlled by the mecha-com 270 after the controller 210 interprets an instruction from the host and outputs the results.

(1) Motor Start

In response to a sensor status representing a completion of loading, the mecha-com 270 outputs a motor start instruction to a spindle servo circuit 251. When the motor 242 starts rotating and reaches a constant velocity rotation, a rotation lock status is sent to the microcomputer.

(2) Stand-by

Under the normal condition of rotation of the motor, the focussing servo system 214 is activated to control the lens in accordance with the surface fluctuation. Next, the tracking servo system 242 is activated to control the spot in accordance with the track fluctuation. Thereafter, the control track information recorded in the disc is read to initialize the drive 200.

(3) Read

A read instruction is sent from the host 100. The controller 210 sends a seek instruction to the mecha-com 270. The mecha-com 270 activates the servo circuit to access a sector of the target track. The completion of seek is informed to the controller 210 which then activates the formatter 230 to instruct data transfer. The formatter 230 transfers the data to the controller 210 which then error-corrects and transfers the requested data to the host.

(4) Write

The erase operation (5) is required prior to the write operation. A write instruction is sent from the host. A seek instruction is sent from the controller 210 to the mecha-com 270 which sets the magnet 261 at the recording mode. The servo circuit 240 is activated to perform a seek operation. The mecha-com performs an LD power control at the position several sectors before the target sector. The completion of write preparation operation is notified to the controller 210 which then informs the write preparation completion to the formatter 230 and transfers data. The formatter 230 performs a write operation to the disc 30. The operation completion is notified to the controller 210.

(5) Erase Operation

A write instruction is sent from the host 100. A seek instruction is sent to the mecha-com 270 from the controller 210. The mecha-com 270 sets the magnet 261 at the erase mode. The servo circuit 240 is activated to access a sector of the target track. The mecha-com 270 performs an LD power control at the position several sectors before the target sector. An erase operation preparation completion is informed to the controller 210 which then informs the erase operation preparation completion to the formatter 230. The formatter 230 activates the LD drive circuit 221 to perform an erase operation. The operation completion is informed to the controller 210.

(6) Seek

Upon reception of an instruction and a target track address from the controller 210, the drive CPU instructs the servo system 240 to perform seek operation. The seek control section of the servo system 240 drives the actuator 281 of the pickup 280 in the tracking direction 240, while performing speed and position control in accordance with the access code data and warble bit data, to then confirm the target track and terminate the seek operation.

The above operations proceed upon instruction from the host.

After recording/reproducing, when an eject button 41c of the load/eject device 41 mounted at the front panel 48a is used, the cartridge case 41a is pushed upward against the force of the spring 41b and reaches the initial position whereat it is held in position by the lock mechanism, and the end portion of the disc cartridge 30 is pushed out of the cartridge inlet 48b by a cartridge pushing mechanism (not shown).

In response to the movement of the cartridge 41a, the bias magnetic field generating section 42a is moved back to the stand-by position by the magnet up/down device 43. In response to the operation of pulling out the disc cartridge 30 by the user, the shutter 36 is closed by the shutter opening/closing device, the disc cartridge 30 is then in the user's hand.

If the eject operation is carried out during rotation of the disc 31, the disc may be damaged. As a countermeasure for this, there is provided a protect device (not shown) by which the rotation of the disc 31 is detected and the eject operation is inhibited during rotation of the disc 31.

The base 46 is held at the chassis 48 by using an anti-vibration mechanism (not shown).

Figure 5:
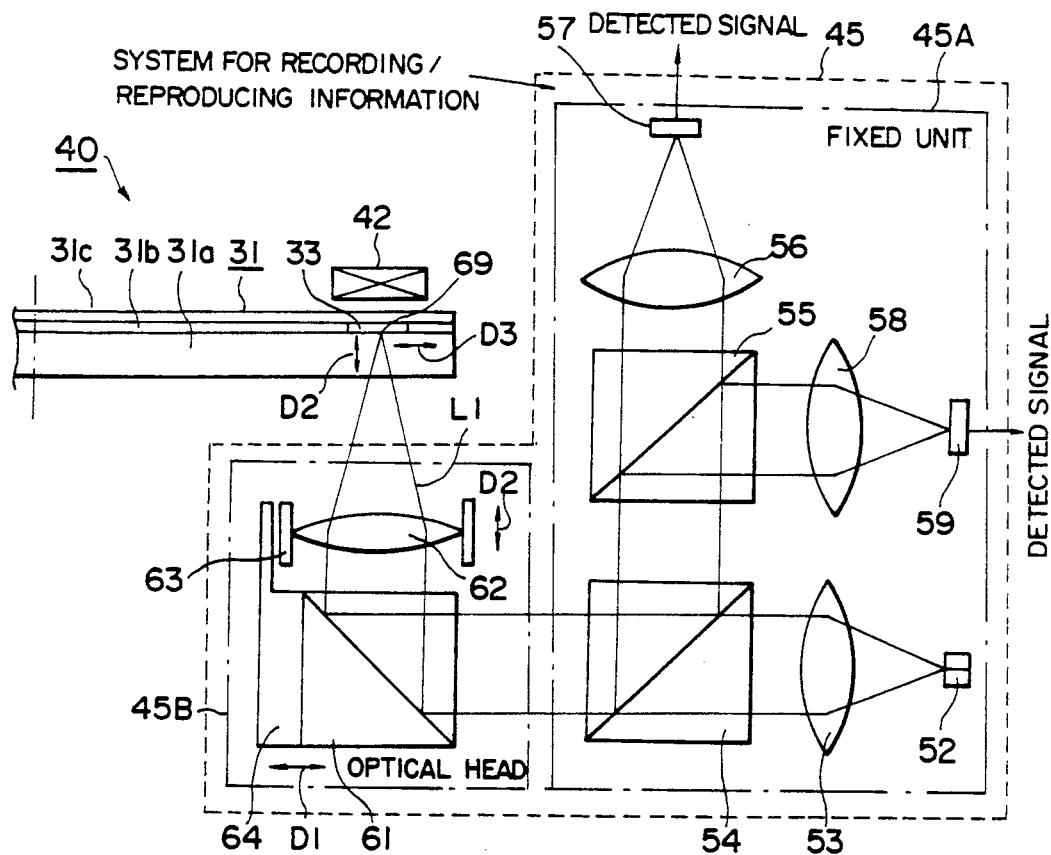
FIG. 5 is a view similar to FIG. 2 which illustrates the recording/reproducing operation of the system shown in FIG. 3.

FIG. 5 is a diagram used for explaining the recording-/reproducing operation of the system shown in FIG. 3. As shown in FIG. 5, in the recording/reproducing operation of the 2.5 inch magnetooptical disc system according to the embodiment of this invention, the 2.5 inch magnetooptical disc cartridge 1 is used and the feed device 7 is omitted as different from the conventional 3.5 inch magnetooptical disc system. In FIG. 5 like elements to those used with the conventional system are represented by identical reference numerals, and the description of the operation is omitted.

The 2.5 inch magnetooptical disc 2 is rotated at CAV 3600 rpm as described previously, and a bias magnetic field is applied to the magnetooptical film 31b by the electromagnet 42. A laser beam L1 from the optical recording/reproducing device 45 is applied to the magnetooptical film 31b for information recording/reproducing. Although the optical head 45b of the optical recording/reproducing device 45 is stationary, the recording/reproducing operation by the device 45 is the same as conventional, so the description therefor is omitted.

The structure of the optical recording/reproducing device 45 shown in FIG. 5 is a schematic diagram showing the outline thereof to be used for explaining the recording/reproducing operation. The actual structure is as shown in FIG. 6.

FIGS. 6A and 6B show the structure of the optical recording/reproducing device of the system shown in FIG. 3. FIG. 6A is a cross sectional side view, and FIG. 6B is a cross sectional plan view.

As shown in FIGS. 6A and 6B, the fixed unit 45a of the optical recording/reproducing device 45 is constructed of a laser diode 52, collimator lens 53, beam shaping prism 66, half-wave plates 67a and 67b, beam splitter 54, polarization beam splitter 68a, photodiode 57, converging lens 58, prism 61c, cylindrical lens 58b and photodiode 59. These optical elements are accommodated within a housing 65 made of resin which is fixed on the reverse side of the base 46. Among these optical elements, the outer diameter of the laser diode 52 is largest, the remaining optical elements can be disposed along the optical axis of the laser diode 52, and the height of the lower surface of the base 46 at which the housing 65 is fixed is greater than that of the lower surface at which the optical head 45B is fixed.

The laser beam radiated from the laser diode 52 passes through the collimator lens 53, beam shaping prism 66, and half-wave plate 67a, and is reflected by the beam splitter 54 to be directed to the optical head 45b. The reflected light at the optical head 45B passes through the beam splitter 54 and half-wave plate 67b, and is reflected by the prism 61b to be incident to the polarization beam splitter 55. The reflected light transmitted through the polarization beam splitter 55 passes through the converging lens 56, cylindrical lens 68a to be incident to the photodiode 57. The reflected light reflected at the polarization beam splitter 55 is reflected again at the prism 61c to be incident to the photodiode 59.

The optical head 45b is constructed of a prism 61a, objective lens 62, focussing servo actuator 60, tracking servo actuator 50 and the like.

The fixed section 50a of the tracking servo actuator 50 is fixed at the lower surface of the base 46. A movable section 50b held by springs 50d at the central area of the fixed section 50a has the prism 61a fixedly mounted at the central area thereof at the position corresponding to a path of the laser beam from the fixed unit 45a. There is fixed on the movable section 50b of the tracking servo actuator 50 a section 63 of the focussing servo actuator 60. There is held by springs 60b at the central area of section 63 a movable section 64 on which the objective lens 62 is fixed at the central area thereof at the position corresponding to the prism 61a. The objective lens projects upward through the hole of the base 46, and faces the record area 33 of the magnetooptical disc 31 during recording/reproducing. The fixed and movable sections 50a and 50b of the tracking servo actuator 50 are formed with a clearance 50c for passing light flux between the fixed unit 45a and prism 61a without any optical obstruction. The direction of motion of the movable section 50b is substantially the same as the direction of the optical axis of light flux. Irrespective of the motion of the movable section 50b, the optical axis of light flux reflected at the prism 61a in the vertical direction is arranged to substantially coincide with the center of the objective lens 62.

The record width of the magnetooptical disc 31 of the optical recording/reproducing device 45 constructed as above is as narrow as 6 mm as discussed previously. It is therefore possible for the light spot 69 to search a record track within the record area without the feed operation by the conventional feed device. Specifically, by means of a magnet and coil (not shown) mounted on the fixed and movable sections 50a and 50b of the tracking servo actuator 50, the prism 61a and objective lens 62 are moved in the radial direction of the disc 31 to thereby perform the tracking servo operation and feed operation. In this case, even if the magnet and coil of the tracking servo actuator 50 are used also for the feed operation, the movable range of the tracking servo actuator is restricted within ±3 mm in the radial direction of the disc 31, the movable range being sufficient for the record width of the disc 31.

The tracking servo actuator 50 causes the objective lens 62 and prism 61a supported by flat springs (not shown) movable in the tracking feed direction to move in the tracking feed direction (indicated by an arrow in FIG. 6B), to thereby perform the tracking operation and feed operation. The actuator carries out an optimum operation to be described later when the record width W1 is about 6 mm or less, because of the mechanical structure thereof.

Specifically, as shown in FIG. 6C, flat springs 73 are extended in parallel between the fixed section 71 and intermediate support member 72. The objective lens 62 is mounted on the support member 72. The flat springs 73 are used as a support member in the tracking direction. With such a suspension type actuator, an access time at high speed operation is shortened to thereby improve the system performance. With such an arrangement, the objective lens 62 moves in parallel in the radial direction of the disc 31 by means of the flat springs 73. In this case, however, because of the deflection of the springs, it moves also in the directions D2 and D3 with a curved locus. This displacement amount is determined by the spring length and the stroke of the disc 31 in the radial direction.

The size of the actuator is determined on the basis of the compact recording medium which has a 65 mm diameter for the 2.5 inch disc. If the drive section and mounting section are made about 50% of the actuator size, the length of the flat spring 73 is about the radius of the disc. The length of the flat parallel spring therefore becomes about 30 mm.

Referring to FIG. 6C, the spring length Ls will be theoretically obtained in the following assuming that the motion amount in the direction D3 is $\Delta X$ and the stroke is Y If the lens 62 moves arcuately, (1) a light flux from the optical separation system deviates from the lens effective diameter, signal level fluctuates and its quality is degraded, and (2) a bias magnetic field of a constant intensity should be applied during erase and record operations, whereas the intensity distribution of a magnetic field becomes lower at the position remote from the center in the radial direction. The limit value according to the above fact (1) will be determined. If a lens of aspheric glass is used, NA=0.55 and the light flux diameter is 3 mm. Assuming that an allowance of the light flux deviation from the center is ±5%, then the deviation is about "3 mm×0.05=0.15 mm". The stroke satisfying the spring length LS 30 mm and $\Delta X \leq 0.3$ (±0.25) is restricted to about 3 mm, so that the record width becomes ±3 mm.

Figure 6D:
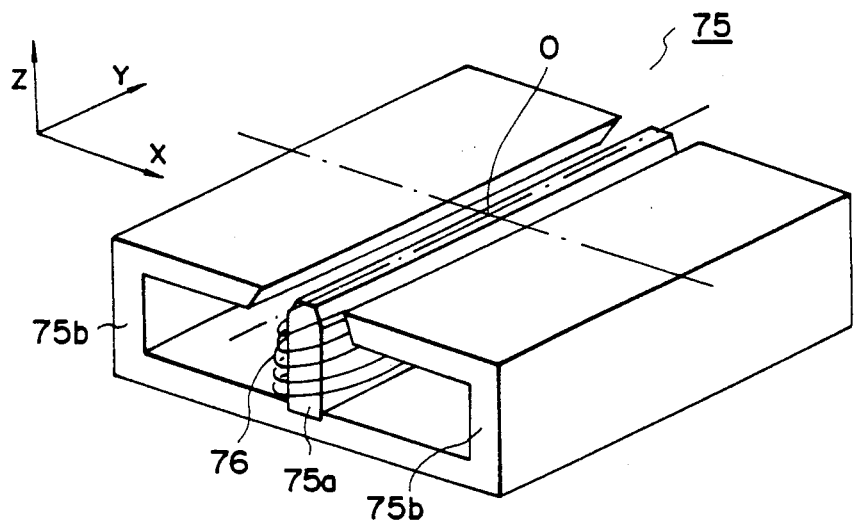
Figure 6E:
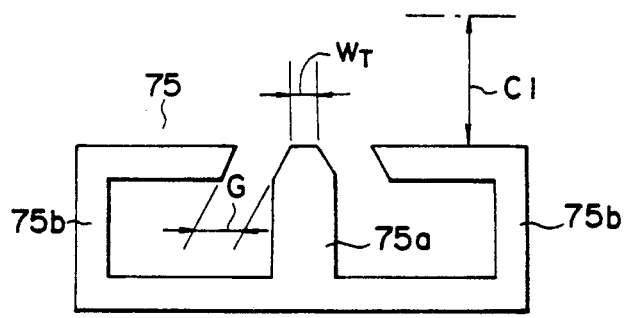
Figure 6F:
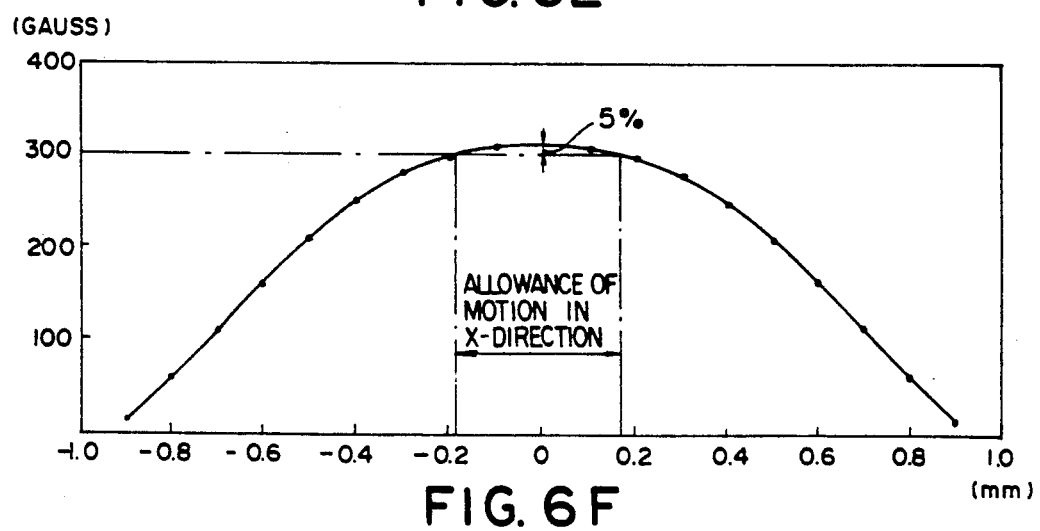

As to the above fact (2), it is assumed that there is used an electromagnet 75 having the structure as shown in FIGS. 6D and 6E. The electromagnet 75 has a main magnetic pole 75a, yoke 75b and winding 76. The direction Y of extension of the main magnetic pole 75a is coincident with the disc radial direction. The magnetic field intensity distribution in the X direction is shown in FIG. 6F. As shown in FIG. 6E, the dimension of the electromagnet 75 are as follows. Namely, the tip surface width Wt of the main magnetic pole 75a is 0.9 mm, the gap G between the main magnetic pole 75a and yoke 75b is 0.4 mm, and the clearance C1 between the magnetic pole and probe is 0.5 mm. Assuming that the allowance of intensity caused by displacement of the magnetic pole in the X direction is within 5%, the allowance is restricted to 0.15 mm or less as seen from the characteristic curve shown in FIG. 6F.

The above limit values are obtained on the basis of the actuator for the disc 31 whose size S1 is 61 mm in diameter. If the size of the disc 31 is changed, there is a possibility that the record area becomes more narrower through optimization of the disc format. However, in practice, the above value of ±3 mm is sufficient for most severe conditions.

Specifically, if the disc 31 has a diameter of 90 mm, the surface fluctuation should be suppressed more severe than the disc of 61 mm diameter. In the case of the above fact (1), it becomes that "Ls=45 mm, and stroke Y≐3.9" for the 90 mm diameter disc. In this case, the tracking and transfer characteristics become worse for Ls=45 mm than for Ls=30 mm, so that an actuator for about Ls=30 mm is suitable and therefore the record width of 6 mm or less is appropriate.

The record width W1 of 6 mm or less is also appropriate when considering the relationship among the area within the recording area 33 of the disc 31, the area factor, and non-defective factor, and the relationship between the outer diameter S1 of the disc 31 and tilt servo operability.

The relationship between the area and non-defective factor, and the relationship between the diameter and tilt servo operability will be described with reference to FIGS. 10A, 10B, 10C and 11.

Figure 10:
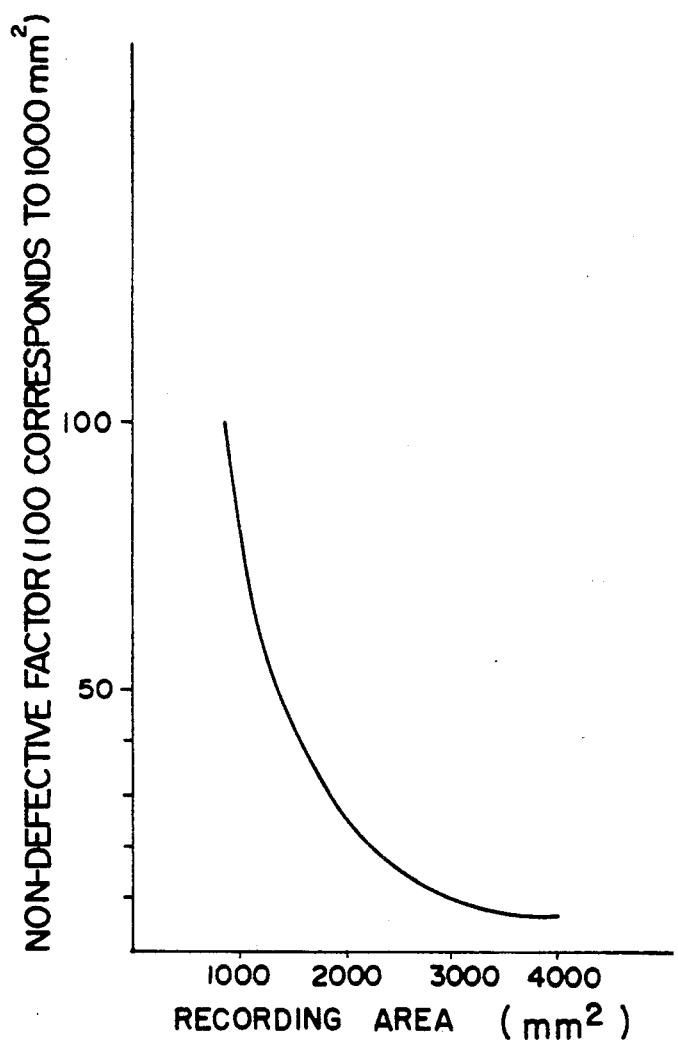
FIG. 10A to 10C are diagrams showing the relationship between the disc record area and the area factor.

First, there will be described the relationship between the area within the disc record width, area factor, and non-defective factor. In the case of a circular disc recording medium (optical disc, floppy disc and the like), it is obvious that the recording area is allocated from near the most outer periphery to the most inner circumference of the disc. The inner circumference of the disc which provides a best efficiency depends on a particular use object of the disc. In the case of data disc, it is generally used at CAV (constant angular velocity) from the standpoint of feasibility of high speed access. In the case of CAV, the total memory capacity is solely determined by the record density at the inner most circumference, so that it is not clever to have an inner most circumference of too small diameter. The of effective area is now defined in order to check the relationship between the most inner circumference and the memory capacity. The effective area is assumed as the product of the length of the most inner circumference and the stroke in the radial direction. The relationship among dimensions of the disc 31 shown in FIG. 10A is given by:

$$\text{effective area Seff} = 2\pi r_0 \times l$$

where $r_0$ is the radius of the most inner circumference, $l$ is the stroke in the radial direction, and $r$ is the most outer circumference. The effective area corresponds to the memory capacity for the case of CAV recording. The effective area and actual area are shown in the graph (FIG. 10B) assuming that the most outer circumference is 80 mm in diameter. The effective area becomes maximum when the stroke is half the radius, whereas on the other hand the actual area greatly increases. For example, the effective area increases only about 5 to 6% as the length l shown in FIG. 10A changes from 15 to 20, whereas the actual area increases about 2%. An increase of area results in a high possibility of defects so that the production yield is degraded. When considering the production yield, (according to the probability theory, the defective factor of discs is proportional to a square of the area. Refering to the relationship between the area within the recording area and the non-defective factor shown in FIG. 10C), it cannot be said that the inner most circumference is optimum when it is determined as half the radius. The quantity of the area factor is defined by:

$$\text{area factor} = \text{effective area/actual area}$$

The area factor takes substantially the same value as the ratio of the most inner circumference to the most outer circumference. It can be said that the more the value becomes near 1, the smaller the difference of record density between the most inner and outer circumferences becomes, leading to an efficient use of a disc. The area factor is shown in the graph of FIG. 10B. As seen from this graph, the smaller the width of the recording area in the radial direction becomes, the more the area factor becomes near 1. However, the effective area, i.e., memory capacity, becomes small. In view of a cheap disc used for personal computers and the present circumstances of personal computers, it can be considered that the capacity of 20 MB to 40 MB per disc may be sufficient. If the area factor of about 95% is allowed, the width of the recording area of 5 to 6 mm is sufficient.

Figure 11:
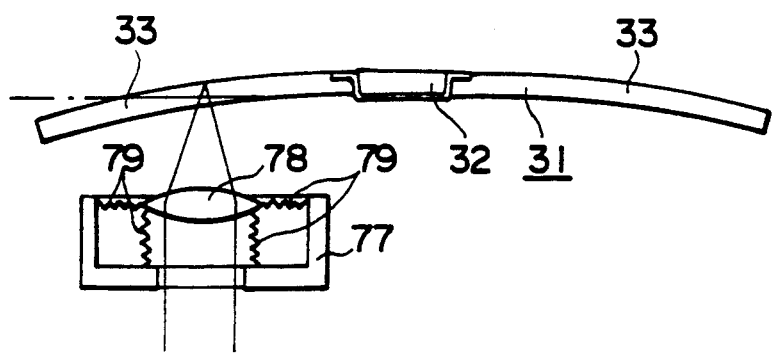
FIG. 11 is a diagram illustrating the relationship between the disc diameter and the tilt servo operability.

Next, there will be described the relationship between the disc diameter and the tilt servo operability with reference to FIG. 11. As is shown exaggerated, the optical pickup 77 performs the information recording-/reproducing relative to the optical disc 31. The optical disc 77 has a lens 78 supported at the optical axis, and a spring 79 for supporting the lens 78. In the information recording/reproducing system having the optical pickup 77, it is necessary that the optical axis of the optical head be perpendicular to the information recording surface of the optical disc.

A disc using a plastic substrate generally has warp and deflection because of distortion during molding and because of a difference of structure between the front and back surfaces of the disc. According to actual checks by technicians, the warp of a disc is mostly of an umbrella shape. The direction of warp may sometimes be reversed depending upon the conditions of plastics molding, film formation, coating and the like. Generally the warp of a disc is small at the inner circumference and becomes larger at outer circumferences. The large warp at outer circumferences gives an adverse effect to the tracking offset, and hence to the tracking stability and signal quality. The warp of a 3.5 inch magnetooptical disc is specified that it should be lower than 5 mrad. The disc warp may be eliminated by laminating plastic plates. However, a compact disc has a single plate structure for the purpose of low cost, so that warp in the radial direction is likely to occur. If a rapid temperature or humidity change occurs during the molding process, a warp is likely to occur. If the broad record width 33 is used, it is necessary to suppress the warp within a predetermined value over the whole area, resulting in a poor production yield of discs. In order to avoid this, an optical head has been proposed wherein the optical pickup 77 is slanted in accordance with the warp of a disc to always maintain the optical axis perpendicular to the record surface. This optical head can alleviate the specification required for the disc 31 while improving the disc production yield and reducing the production cost. However, the degree of disc warp differs between the inner and outer circumferences, so that the optical pickup is required to perform information recording/reproducing at a different slant angle between the inner and outer circumferences of the disc 31.

A data disc requires a high-speed access from the standpoint of memory capacity so that the optical disc moves at high speed in the radial direction of the disc. Accordingly, the slant angle of the optical pickup is required to be changed at high speed corresponding to such high speed access, which is very difficult according to the current level of technology. Even if it can be realized, the system becomes too large and contradicts the demand for miniaturization of the system. In practice, therefore, for an optical pickup having a slant angle adjustment mechanism, the slant angle of the optical pickup is adjusted only once when a disc is mounted, and all the area from the inner to outer circumference is subjected to recording/reproducing with the fixed slant angle. In the case of a broad record width, the difference of warp between the most inner and outer circumferences becomes greater so that the slant angle adjustment only once is not sufficient also for such discs.

While considering the above-described various points and according to the experiences by technicians at manufacturing site, it has been found that an optimum disc has the most outer diameter of about 60 mm and the diametrical stroke of about 6 mm, and that the slant angle adjustment of the optical pickup only once is sufficient for substantially precise recording/reproducing. It becomes therefore easy to manufacture optical discs at low cost.

The description will now be directed again to the optical disc recording/reproducing device 45 shown in FIGS. 6A and 6B.

In the above-described arrangement of the optical recording/reproducing device 45 in the system 40, the optical paths of the two photodiodes 57 and 59 are changed in the direction perpendicular to and parallel with the optical axis of the light flux between the fixed and optical heads 45A and 45B. In addition, within the span of the path of light flux between both the units, the optical elements constituting the fixed unit 45A inclusive of the laser diode 52 are accommodated. Accordingly the distance deeper than the cartridge case 31 in the direction of insertion the disc cartridge 30 becomes short, thereby allowing the depth of the system 40 to have the target value (4 inch). Furthermore, the width between the laser diode 52 and photodiode 57 of the fixed unit 45A becomes narrower than that of the disc cartridge 30, thereby allowing the width of the system to have the target value (2.9 inch). Furthermore, the distance between the optical axis of the light flux between the fixed unit and optical heads 45A and 45B and the lower surface of the base 46 at which the optical head 45B is fixed, is as short as about half the outer diameter of the laser diode 52, thereby allowing the height of the system 40 to have the target value of 1 inch.

Since the disc cartridge 30 is compact, the 2.5 inch magnetooptical disc system 40 according to the embodiment of this invention can be made compact and light weighte.

The disc cartridge 30 itself is compact and light weight and convenient to handle, so that it can be put into an ordinary size envelope, thus being suitable for personal use.

Furthermore, since the outer diameter of the magnetooptical disc 31 is small, the spindle motor 44a of the rotary drive device 44 can be made compact, light weighted, and of low power consumption.

Furthermore, since the linear velocity of the record track of the disc 31 is slow, low power consumption of the laser diode 52 is possible.

Since the width of the recording area of the disc 31 is narrow, the electromagnet 42 can be made compact, light weighted, and of low power consumption.

The feed device is omitted because of the narrow recording area so that the system can be made compact, light weight, and of low power consumption.

Since the disc cartridge 30 is compact, the load/eject device 41, electromagnet up/down device 43 and the like can be operated manually so that they can be made compact, light weighted, and of low power consumption as compared with electricity-driven devices.

With the above arrangement of the optical recording/reproducing device 45, the system 40 can be made compact.

The two photodiodes 57 and 59 are positioned in the same direction in the fixed unit 45A, so that the adjustment of the photodiodes 57 and 59 can be carried out easily.

The direction of inserting the disc cartridge 30 in the system of this embodiment has been set in the direction of the depth of the system 40. However, the direction of insertion may be in the direction of width of the system 40.

Furthermore, the electromagnet up/down device 43 for removably setting the electromagnet 42 at the predetermined recording/reproducing position has been described as operating in the up/down direction. However, the operation of the device may be a rotary motion.

The load/eject device 41 has been described as the downward motion of the disc cartridge 30. However, the base 46 may be moved upward instead.

The compact magnetooptical disc system of this invention constructed as above is compact, light weighted, and of low power consumption. Accordingly, the operation feasibility is improved when it is mounted on a portable personal computer or the like, and is suitable for personal use.

We claim:

1. An optical recording/reproducing system for optically recording and reproducing an information signal onto and from an optical disc to be recorded with a plurality of track turns used at constant angular velocity, comprising:

a light emitting element for radiating a laser beam;

an optical head comprising a tracking servo actuator having a fixed section and a movable section;

a magnetooptical disc having a perpendicular magnetization layer with a coercive force changeable by heat generated by a laser beam, and a plurality of track turns formed thereon providing a recording area having a maximum diameter of substantially 60 mm;

an objective lens and prism mounted in said movable section for directing said laser beam in a path to one of said track turns;

spring means for supporting said movable section on said fixed section;

said fixed section being stationary with respect to a plane of said magnetooptical disc while said movable section performs said track feed and tracking servo operations by displacing said laser beam in a radial direction of said magnetooptical disc;

an actual recording area on said magnetooptical disc comprising said plurality of track turns having a radial dimension restricted with 6 mm for the outermost circumference of said recording area to enable performance of both track feed and tracking servo operations of said one of said track turns by said movable section in an optimum condition;

magnetic field generating means for generating an external magnetic field in a predetermined direction for recording information and for generating an external magnetic field in a direction opposite to said predetermined direction for recording to erase recorded information comprising electromagnet means having a bias magnetic field generating section for applying a bias magnetic field to said recording area of said magnetooptical disc, and a setting mechanism for setting said electromagnet at a predetermined recording/reproducing position;

means for reproducing said recorded information by rotation of a polarized plane of said directed laser beam;

a cartridge for holding said magnetooptical disc;

a load/eject means for loading and ejecting said cartridge to and from a predetermined position in said system;

a rotary drive device for rotating said magnetooptical disc at a predetermined rotational speed;

light receiving means for producing at least one signal in response to detection of reflected light from said magnetooptical disc;

a planar base mounted parallel with said magnetooptical disc loaded into said system;

said load/eject means and electromagnet device being mounted on one surface of said base; and said optical head comprises an optical recording/reproducing means fixedly mounted on the other surface of said base and including an optical pickup for performing information recording/reproducing by using said laser beam to and from said recording area of said disc, and comprising a fixed member and a movable member, said fixed member being disposed at a position adjacent said cartridge, and said movable member being disposed along an optical axis of light flux from said fixed member and having said tracking servo actuator which performs both a feed operation and a tracking servo operation accessible to an entire area of said recording area by moving in the radial direction of said disc;

the distance between the optical axis of said laser beam light flux extending from said fixed member to said movable member, and said other surface of said base being no greater than substantially half the outer diameter of said light emitting element.

2. An optical disc recording/reproducing system as claimed in claim 1, wherein said system is housed within a casing having a width of 2.9 inches, a depth of 4 inches and a height of 1 inch.

3. An optical disc recording/reproducing system ass claimed in claim 1, wherein:
said track turns are concentric within said recording area.

4. An optical disc recording/reproducing system as claimed in claim 1, wherein:
said track turns comprise spiral tracks within said recording area.

5. An optical disc recording/reproducing system as claimed in claim 4, wherein said disc is a 2.5 inch disc.

6. An optical disc recording/reproducing system as claimed in claim 1, wherein said disc is a 2.5 inch disc.

7. An optical disc recording/reproducing system as claimed in claim 1, wherein:
said optical head further comprises mirror means for changing the path of said laser beam by reflecting said beam to and from said disc.

8. An optical disc recording/reproducing system as claimed in claim 1, wherein:
said optical head further comprises prism means for changing said laser path by spectral reflection to and from said disc.

9. An optical disc recording/reproducing system as claimed in claim 1, wherein:
said spring means enables said movable section to perform said tracking operation in the radial direction of said optical disc.

* * * * *